Oct. 31, 1933.  E. O. FREDERICS  1,933,249
TIME CONTROL DEVICE
Filed May 10, 1930   3 Sheets-Sheet 1

INVENTOR.
Ernest O. Frederics
BY
F. P. Warfield
ATTORNEYS

Oct. 31, 1933.   E. O. FREDERICS   1,933,249
TIME CONTROL DEVICE
Filed May 10, 1930   3 Sheets-Sheet 2

INVENTOR.
Ernest O. Frederics
BY F. P. Warfield
ATTORNEYS.

Oct. 31, 1933.  E. O. FREDERICS  1,933,249
TIME CONTROL DEVICE
Filed May 10, 1930  3 Sheets-Sheet 3

INVENTOR.
Ernest O. Frederics
BY
F. P. Warfield
ATTORNEYS

Patented Oct. 31, 1933

1,933,249

UNITED STATES PATENT OFFICE 1,933,249

TIME-CONTROL DEVICE

Ernest O. Frederics, New York, N. Y., assignor to E. Frederics, Inc., New York, N. Y., a corporation of New York Application May 10, 1930. Serial No. 451,224

6 Claims. (Cl. 200—39)

This invention relates to time-control devices, and particularly to a device for controlling the time of operation of an electrical device such, for example, as the electric heaters utilized in hair waving operations.

In general, it is an object of the invention to provide a time-control device of the character described which will efficiently accomplish the purposes for which it is intended, which is certain and positive in operation, which is simple and economical of construction, and which can be operated with a minimum of attention.

A more particular object of the invention is to provide a time-control device which is fool-proof and which can be operated with a minimum of attention.

Another object of the invention is to provide mechanism which will respond to the operation of an operating member with certainty and celerity.

Another object is to provide improved means for controlling the operation of an electric switch.

Other objects of the invention will in part be obvious and will in part appear hereinafter.

The invention accordingly comprises an article of manufacture possessing the features, properties, and the relation of elements which will be exemplified in the article hereinafter described and the scope of the application of which will be indicated in the claims.

For a fuller understanding of the nature and objects of the invention reference should be had to the following detailed description taken in connection with the accompanying drawings, in which.

In the operation of various types of electrical apparatus, and particularly in the use of an electrical heater in hair waving operations, it is desirable that the current be turned on at the beginning of the operation and that it be automatically turned off when a predetermined time has elapsed. In the use of such apparatus it is particularly desirable that a positively operating time-control device be employed so as to avoid such undesirable consequence as the overheating of a subject's hair in a waving operation. With these and other ends in view the present invention contemplates the provision of a time-control device which is simple in construction, which can be operated with extreme ease, and which at the same time is certain and efficient in operation.

Figure 3:
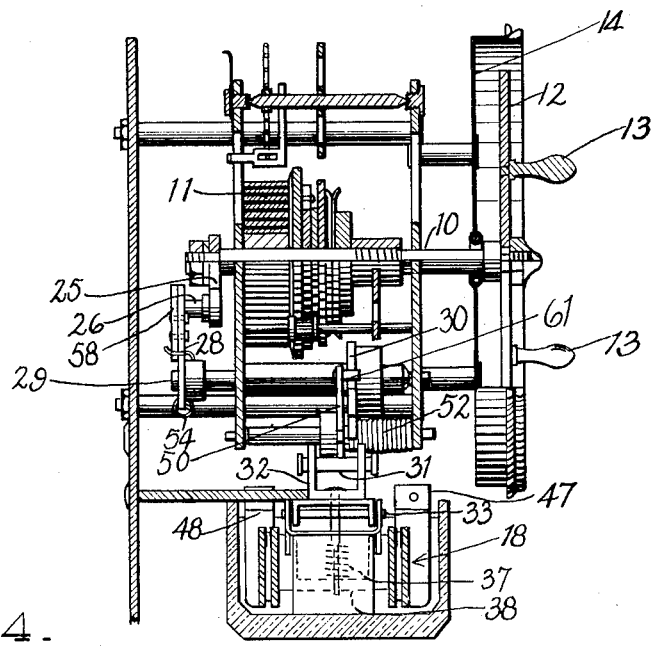
Fig. 3 is a reduced scale vertical transverse section taken along the line 3—3 in Fig. 2.
Figure 4:
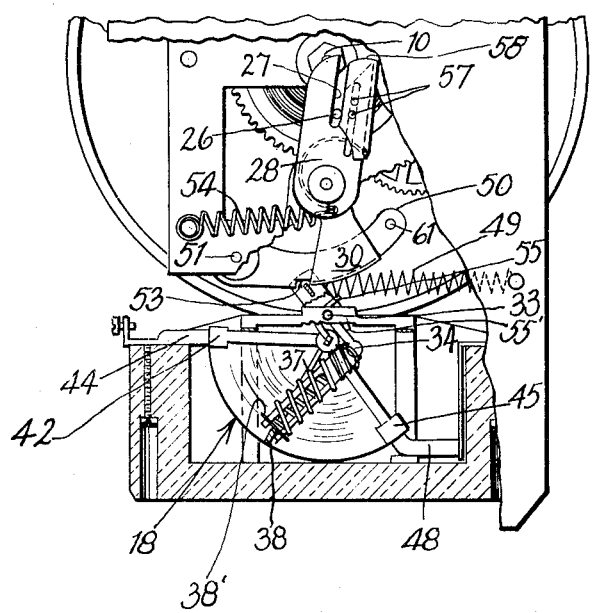
Fig. 4 is a fragmentary view similar to Fig. 2 showing on a reduced scale certain of the parts in a different position.

The invention is exemplified in connection with a machine provided with a clock mechanism indicated generally in Fig. 3, and comprising an operating shaft 10 and suitable operating means such as a main spring 11 mounted on the shaft. At the forward end of tht shaft is an operating or winding arm in the form of a pointer 12 equipped with suitable handles 13 and movable along a calibrated dial 14. The pointer is normally held against a stud 15 by the action of the main spring and is adapted to be moved past calibrations, as indicated at 16, to an operating position which may be suitably indicated at 17.

The device also includes an electric switch indicated generally at 18 for completing an electric circuit through conductors 19 and 20, a heating element 21, or other electrical device, and conductors 22 and 23, the conductors 19 and 23 being suitably connected with a source of electric current. If desired, there may be connected between the leads such as the conductors 20 and 22 a suitable device for assisting in determining the setting of the pointer 12 such, for example, as the voltmeter 24. The exemplified mechanism for operating the electric switch comprising an arm 25 extending radially from the shaft 10 and carrying a pin 26 which extends rearwardly into a slot 27 in a lever arm 28 which is carried on a rotatably mounted shaft 29.

The shaft 29 also carries an arm 30, in the path of movement of which there is disposed a controlling element, provided in the present motion by a cross-piece 31 carried in the U-shaped upper end of a lever or crank 32 which is centrally pivoted at 33. At the lower end of this lever there is formed a knob 34 fitting within a socket 35 in the end of a freely mounted member 36 about which a coil spring 37 is disposed. The lower end of the member 36 is fork-shaped and fits over a cross-piece 38 against which the spring 37 bears through the medium of a plate 38'. The cross-piece 38 is a part of a U-shaped member 39 mounted on a rotatable shaft 40 which carries switch arms 41 and 42 adapted to be moved against contacts 43 and 44 at one side of the circuit and switch arms 45 and 46 adapted to be moved against contacts 47 and 48 at the other side of the circuit, the contacts and arms being so arranged that when the shaft 40 is rotated to a given extent the switch arms will all make contact so as to close the circuit by joining the conductor 19 with the conductor 20 and the conductor 22 with the conductor 23.

Figure 2:
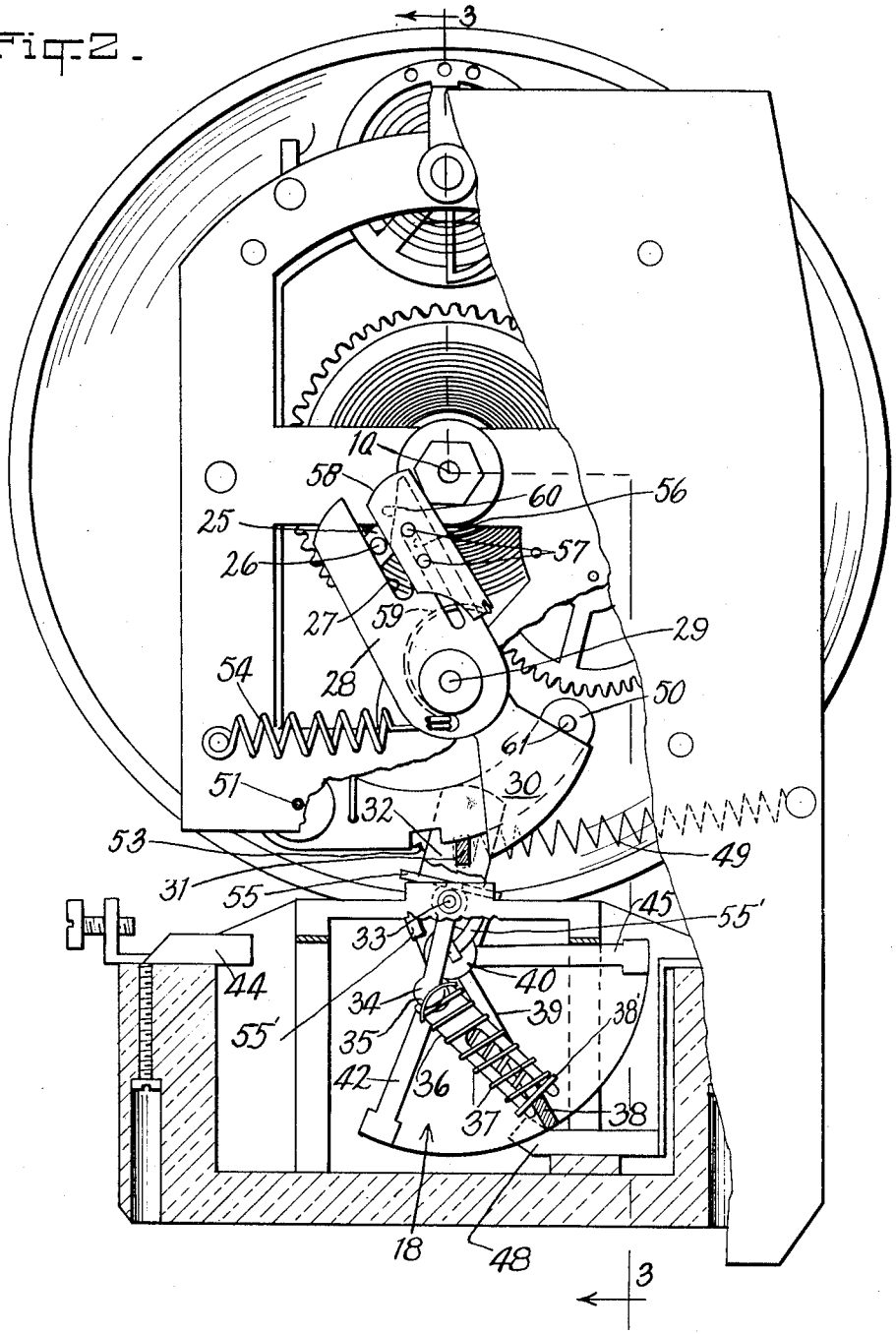
Fig. 2 is an enlarged rear view of the interior mechanism, certain of the parts being broken away.

For the purpose of normally holding the switch open there is provided a spring 49 which tends to draw the upper end of the lever 32 to the right so as to move the knob 34 to the left of the U-shaped member 39. In this position the spring 37 urges the cross-piece 38 to the right causing the shaft 40 and the entire switch mechanism to rest in the position shown in Fig. 2. When, however, the operating arm or pointer 12 is moved from the stud 15 to the point 17, causing the shaft 10 (when viewed from the rear) to move in a counter-clockwise direction, the pin 26 moving to the right will move the lever 28 so as to swing the arm 30 to the left. Above the cross-piece 31, which is moved by the arm 30, is a control member 50 which is pivoted at 51 and held against the cross-piece 31 by a spring 52; and a notch 53 is formed in the lower surface of the member 50. As the cross-piece 31 moves to the left, it will be received within the notch 53. The knob 34 will by this time have moved to the right of the U-shaped member 39 so that the spring will press upon the cross-piece 38 from the right, and will swing the switch 18 to a position wherein the switch arms are against the contacts.

A spring 54 is provided to hold the lever 28 firmly in position, and the arm 32 carries a suitable plate 55 provided with lugs 55' which are adapted to contact with the member 39 to limit the movement of the arm 32.

It is to be observed that the pin 26 is so positioned in the slot 27 that as the operating arm 12 reaches the "stop" point 17, the pin will slide wholly from the slot and will move above the right-hand side of the arm 28. Return movement of the operating arm, either manually or under control of the clock work, would be difficult unless the upper surface were inclined at this point, and if the arm itself were provided it would be difficult to arrange the pin so as to move the arm a sufficient distance to the right. To avoid these difficulties, the arm 28 is formed with a slot 56 through which there extend pins 57 carrying plate 58.

Figure 1:
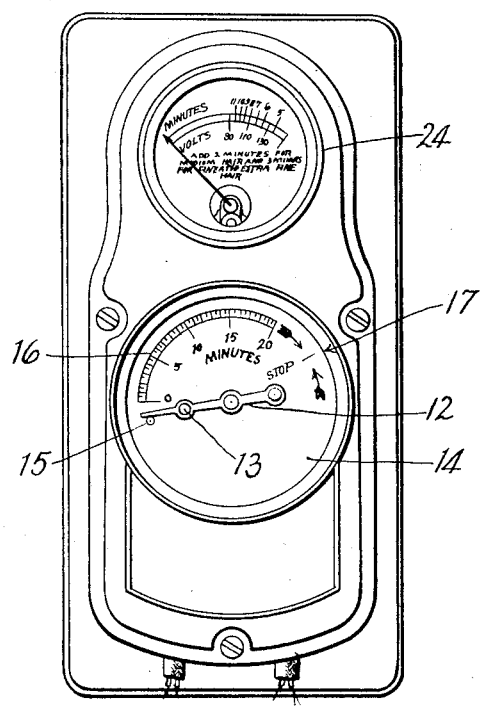
Figure 1 is a front view of a time-control device embodying the invention.
Figure 6:
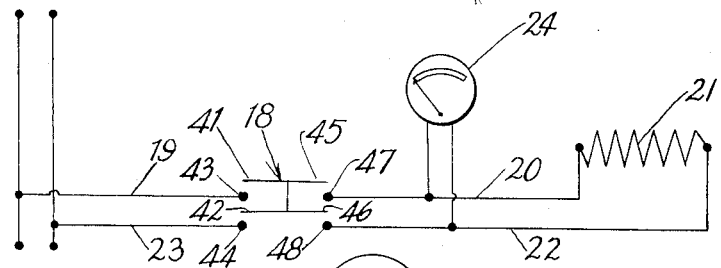
Fig. 6 is a diagrammatic showing of a circuit arrangement such as may be utilized in connection with the device.
Figure 5:
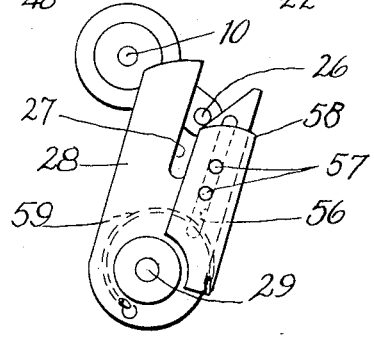
Fig. 5 is a fragmentary view showing certain of the parts in still another position.

The plate is normally held in an upward position by the spring 59 and thus provides a right-hand slot for the pin 26 when it moves to the right. When it has ridden above the plate 58, however, and begins its return movement it will press this plate downwardly so as to enable it to ride along the bevelled surface 60 in the manner indicated in Fig. 5.

In order to move the member 50 upwardly so as to free the laterally extending member 31 from the notch 53, the arm 30 is formed with an inclined right-hand edge, in the path of which there is disposed a stud 61 on the member 50. This stud is so positioned that the arm 30 will not contact therewith so as to free the cross-piece 31 from the latch provided by the notched arm 50 until the co-operating arm or pointer 12 has approached the end of its return movement.

In using a construction such as that under consideration, it is only necessary for an operator to swing the operating arm or pointer to the point 17 which is marked "Stop", and then back again to a position along the dial indicating the number of minutes for the treatment. He can then turn his attention elsewhere with the assurance that the current will be effectively turned off when the spring 11 has returned the pointer to its original position. As the stud 61 rides up the edge of the member 30, the spring 49 is permitted to pull the laterally extending member 31 to the right so as to open the switch; this action taking place approximately at the time the pointer passes the zero of indication on the dial. It is to be noted, moreover, that an accidental turning of the pointer, or a turning of the pointer to a position on the dial by an unskilled person, will not operate the switch or initiate a hair waving operation.

Since certain changes may be made in the above article and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having described my invention, what I claim as new and desire to secure by Letters Patent, is:

1. A time-control device, comprising a calibrated scale, an operating arm providing a pointer movable along said scale and beyond the calibrations thereof, a switch, means to close said switch when said pointer has reached a given position beyond one end of said scale, a stop for limiting the movement of said operating arm when said pointer has passed the other end of said scale, on its return movement, means permitting the manual return of said arm from said position beyond said scale to any predetermined position on said scale, clock mechanism for returning the operating arm to said stop from said predetermined position along said scale, and means to open said switch when said operating arm approaches said stop.

2. A time-control device, comprising clock mechanism, a shaft carrying a main spring forming a part of said clock mechanism, an operating arm carried on said shaft and providing a pointer, an arcuate scale disposed along a part of the path of movement of said pointer, a switch, switch-operating mechanism under the control of said shaft and including means to close said switch when said pointer has been moved to a given point beyond said scale during the winding of said main spring and means permitting the manual return of said arm from said position beyond said scale to any predetermined position on said scale, said switch-operating mechanism also including means to open said switch after the period of time required by said clock mechanism to move said pointer in the opposite direction from said predetermined position on said scale to a point adjacent the opposite end of said scale.

3. A time-control device, comprising a switch, and operating mechanism therefor, said operating mechanism including a pivoted lever arm formed with a slot therein, a pivoted arm carrying a pin movable within said slot, means to move the pin-carrying arm so as to swing the lever arm on its pivot and carry the pin out of said slot, and means to facilitate the reentry of the pin into the slot, said last mentioned means comprising a spring pressed member slidably mounted on said lever arm and a member fixedly connected with said lever arm and formed with an inwardly inclined surface adapted to guide said pin as the same depresses said slidably mounted member.

4. A time-control device, comprising an operating shaft, an arm carried thereby, a pin on said arm, a pivotally mounted lever arm having a forked end providing a slot for the reception of said pin, a portion of said arm at one side of said slot being formed with a bevelled surface to facilitate entry of said pin into said slot, and means providing a guide parallel to the edges of said slot for guiding said pin during its movement away from the end of said slot, the last-mentioned means being yieldably mounted to permit the pin to contact with said inclined surface during the return movement of said pin after it has ridden out of said slot.

5. A time-control device, comprising an operating shaft, an arm carried thereby, a pin on said arm, a pivotally mounted lever arm having a forked end providing a slot for the reception of said pin, a portion of said arm at one side of said slot being formed with a bevelled surface to facilitate entry of said pin into said slot, and means providing a guide parallel to the edges of said slot for guiding said pin during its movement away from the end of said slot, said arm being formed with an internal slot extending parallel to the aforesaid slot from a point at one side of said inclined surface, and said last-mentioned means comprising a plate, a portion of which lies over said inclined surface, a guiding pin extending from said plate into said internal slot, and a spring normally holding said pin at the outer end of said internal slot.

6. A time-control device, comprising clock mechanism, a shaft carrying a main spring forming a part of said clock mechanism, an operating arm mounted at one end of said operating shaft and providing a pointer, an arcuate scale over which said pointer is adapted to move, a second shaft beneath the aforesaid shaft, operatively connected arms extending from said shafts, a second arm carried by said second shaft, a controlling element in the path of movement of said second arm, means tending to hold said controlling element against said second arm, latch means for retaining said controlling element in a position to which it is adapted to be moved by a movement of said second arm in one direction, means responsive to a return movement of the second arm for releasing said latch member, a switch, and means responsive to the movement of said controlling element for operating said switch.

ERNEST O. FREDERICS.